March 18, 1969  N. T. FALKENBLAD ET AL  3,433,454

PLUG-TYPE VALVE

Filed Aug. 24, 1965

Inventors:
Nils Tore Falkenblad
Claes Bertil Sjöholm

Inventors:
Nils Tore Falkenblad
Claes Bertil Sjöholm

United States Patent Office 3,433,454
Patented Mar. 18, 1969

3,433,454
PLUG-TYPE VALVE
Nils Tore Falkenblad, Lund, and Claes Bertil Sjöholm, Malmo, Sweden, assignors to Alfa-Laval AB, Tumba, Sweden, a corporation of Sweden
Filed Aug. 24, 1965, Ser. No. 482,055
Claims priority, application Sweden, Sept. 3, 1964, 10,570/64
U.S. Cl. 251—331                11 Claims
Int. Cl. F16k 51/00

ABSTRACT OF THE DISCLOSURE

The valve housing contains a valve plug mounted for movements in a plane common to the inlet and outlet of the housing, and this plug is surrounded by a sleeve-shaped membrane secured in the housing to define therewith an annular channel through which the inlet communicates with the outlet, the plug being movable in said plane to a closing position for causing the membrane to seal the inlet or outlet. The housing also contains a member supporting a cam for movements in a direction substantially perpendicular to the aforesaid plane, and the cam is actuated in said perpendicular direction from outside the housing to move the plug in said plane by sliding abutment of the plug against a surface of the cam inclined to its direction of movement.

---

This invention relates to valves and particularly to valves of the type having a valve housing with at least one inlet and outlet, a valve plug fitted in the valve housing and movable in a plane common to the inlet and outlet, a means accessible outside the housing for moving the plug in said plane, and a sleeve-shaped, resilient membrane fitted around the plug in the valve housing and connected in sealing relation to the valve housing externally to the inlet and outlet so that an annular channel communication is formed between the inlet and the outlet by the inner wall of the valve housing and the membrane.

Valves of the type mentioned above are known in the art, but they have the drawback that their construction is complicated as regards the operating means.

The object of the present invention is to provide a valve of the above-named kind which is of simple construction.

For a better understanding of the invention, reference may be had to the following detailed description and accompanying drawings, in which FIG. 1 is a vertical sectional view of one form of valve made according to the invention;

Figure 1:
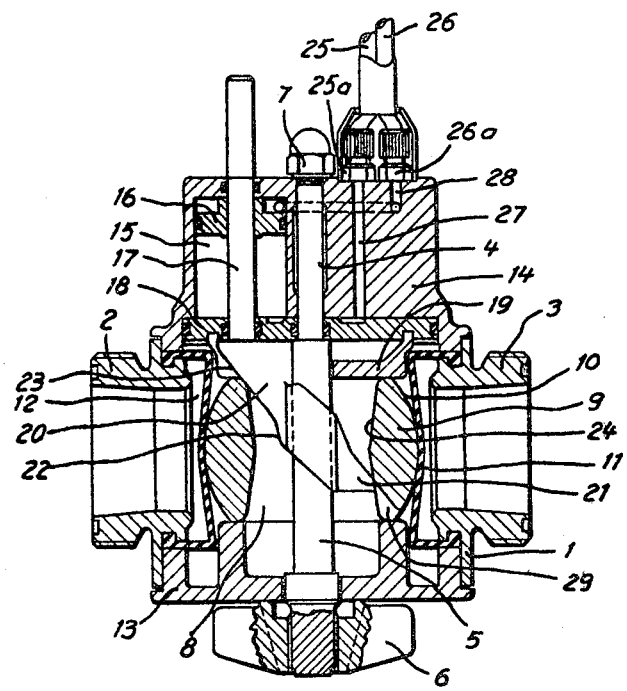
Figure 2:
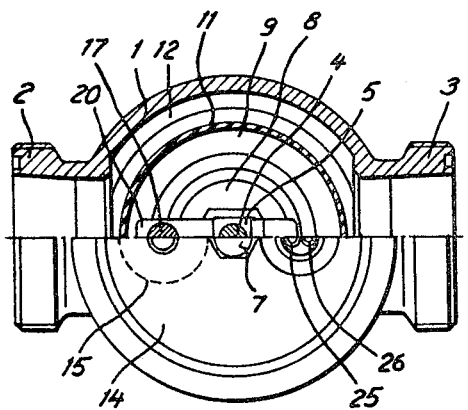
FIG. 2 is a view, partly in plan and partly in horizontal section, of the valve shown in FIG. 1.

In FIGS. 1 and 2, reference numeral 1 designates the valve housing having an inlet nipple 2 and an outlet nipple 3. A stem 4 extending through the valve housing has a part 5 with a square cross-section inside the valve housing proper and is provided with a fly nut 6 at one of its ends and with a usual nut 7 at the other end. An annular valve plug 9 with a spherical outer surface 10 is fitted within the inner cavity 8 of the valve housing. The plug surrounds the stem with a large clearance. A sleeve-shaped, resilient membrane 11 surrounds the plug 9 and at its ends has outwardly extending flanges secured tightly to the valve housing above and below the passages formed by nipples 2 and 3, so that a ring-shaped or annular chamber 12 is formed between the membrane and the inner wall of the valve housing, said chamber being in communication with the inlet and outlet nipples. The end flanges of membrane 11 are tightly secured to the valve housing 1 by means of the lower bottom cap 13 and the upper bonnet 14 of the valve housing. The cap and bonnet are assembled to the valve housing by the stem 4, 5 and the nuts 6, 7.

The bonnet 14, which constitutes a part of the valve housing, comprises a cylinder chamber 15 with a piston 16 and a piston rod 17. The cylinder chamber is sealed in downward direction by a bottom 18 which has a lower bottom part 19. The bottom part 19 forms with the bottom cap 13 a guide and sliding surfaces for the plug 9 which is movable laterally between them in directions to and from the inlet and outlet nipples, which can be sealed by the membrane when the plug is displaced toward them.

The piston rod 17 is guided at both ends and, in its upper position, protrudes outside the bonnet so that it will be fully visible. The lower end of the piston rod extends into the valve housing where it is connected to a cam 20. The latter has a portion surrounding the square part 5 of the stem 4, along which the cam is slidable. The cam 20 is located on one side of the stem 5 and is provided with a projection 21 on the opposite side. The side of the cam 20 which faces the nipple 2 is provided with a profile having a slight rise 22 nearest to the stem, which rise changes into a steeper rise 23. When the piston 16 moves downward, the cam profile moves the plug 9 to the left in FIG. 1 so that the membrane 11 is brought into contact against the orifice of the nipple 2 and seals it completely. In order to enusre that the pressure from a fluid medium in the nipple 2 may not push back the plug, it is preferable that the cam 20 in its bottom position has entered the plug and with its left hand edge, which is rounded, bears against an annular, slightly conical inner surface 24 of the plug. Owing to the small conicity, the pressure exerted on the plug by the medium in the nipple 2 cannot displace the cam upwards against the action of the forces acting upon the piston 16.

The piston 16 is actuated by a pressure medium constituted by air, gas, steam or a liquid. The pressure medium is supplied and discharged through pipes 25 and 26. A channel 27 in the bonnet 14 connects the pipe 25 to the underside of the piston 16, and a similar channel 28 connects the pipe 26 to the upper side of said piston. This arrangement allows for a simple remote control of the piston.

At its under side, the plug 9 is provided with a recess 29 for the projection 21 of the cam. When the cam 20 moves upwards from its lowest position through the action of piston 16, the pressure of the medium in the nipple 2 is generally sufficient to push the plug aside so that the orifice of the nipple is uncovered. In order to facilitate this opening motion of the plug, the cam may be provided with the projection 21 which, when the cam moves upwards, actuates the plug so that the latter moves to the right in FIG. 1. For that purpose, the projection 21 of the cam has a suitably sloped working surface engageable with a coacting surface above recess 29. The projection 21 does not act upon the plug 9 when the cam moves downwards.

Figure 3:
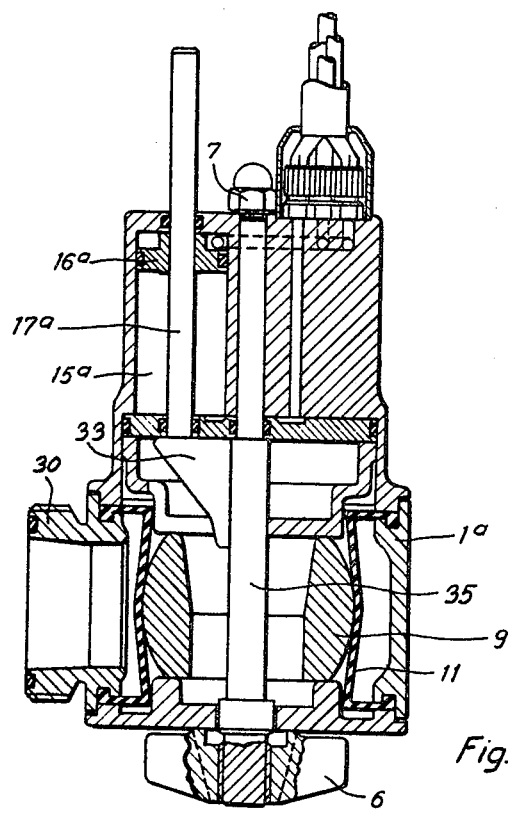
FIGS. 3 and 4 are views similar to FIGS. 1 and 2, respectively, of a modified form of the new valve.
Figure 4:
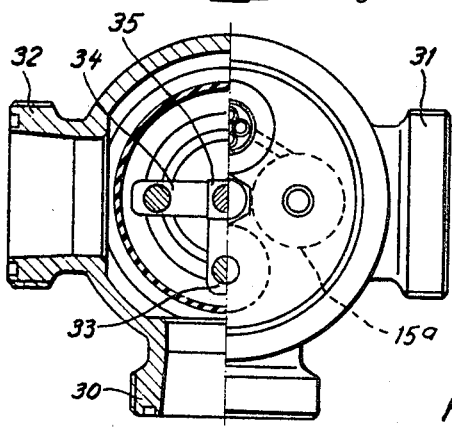

The embodiment according to FIGS. 3 and 4 is in most respects similar to the above described embodiment but differs from it in that housing 1a has two inlet nipples 30 and 31 as well as an outlet nipple 32. Each inlet and outlet is controlled by its own piston 16a with cylinder 15a, piston rod 17a and cam, but the cams 33 and 34

(the third cam is not shown) do not surround the rod 35 extending through the valve housing but abut against and slide along said rod which, for that purpose, is provided with flat contact surfaces against the cams. When the pistons are double-acting, each piston side is provided with its own inlet and outlet and its own channels in the bonnet, but their arrangement is not described here more in detail as it will be readily understood.

Figure 5:
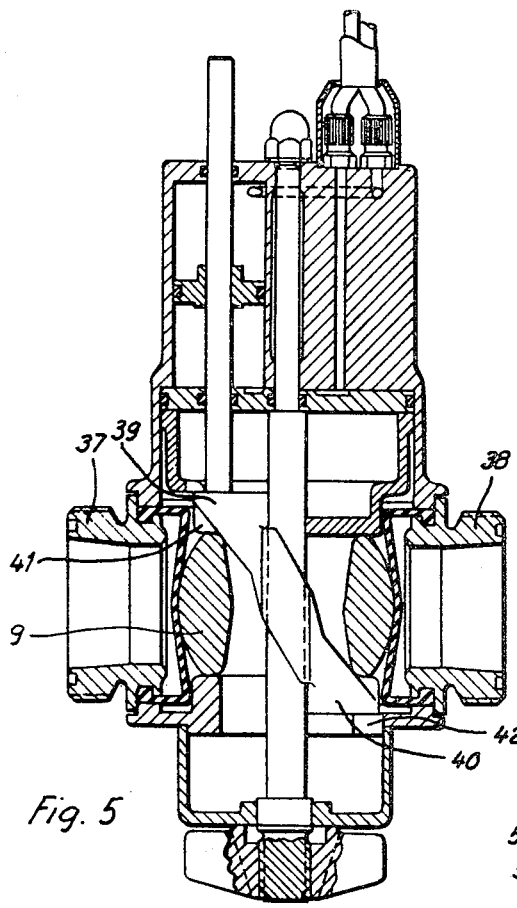
FIGS. 5 and 6 are views similar to FIGS. 1 and 2, respectively, of still another embodiment of the new valve.
Figure 6:
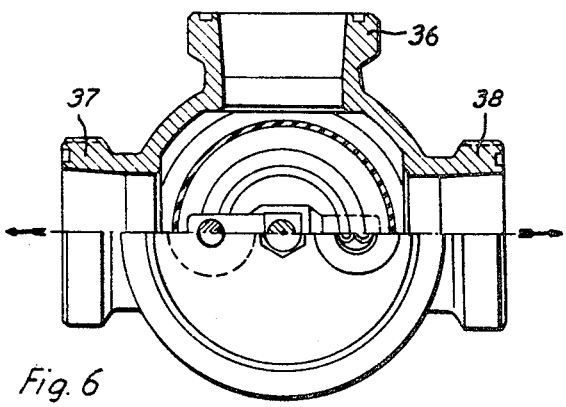

The embodiment according to FIGS. 5 and 6 is a variant of the preceding embodiments and in most respects is similar to them but differs from them in that it is provided with an inlet nipple 36 and two outlet nipples 37 and 38, the latter two being diametrically opposite each other. It is a so-called change over valve in which only the outlets can be shut off. The device which actuates the plug is in this case double-acting, which means that one of the outlets is shut off when the device has performed its stroke in one direction and the other outlet is shut off when the device has performed its stroke in the other direction. The actuating device in this case comprises only one piston with a cylinder, a piston rod and a cam, but the projection 40 of the cam 39 is an exactly reversed replica of the cam 39. When the cam 39 moves downwards, it actuates the plug 9 so that the left hand outlet 37 is shut off, and when the cam moves upwards the projection 40 of the cam actuates the plug so that the other outlet 38 is shut off. This double-action of the cam with its projection 40 brings about a very fast shut-off of the respective outlets.

The parts of the valve casing which form sliding surfaces and guides for the plug 9 (FIG. 5) are provided with recesses 41 and 42 in which the cam 39 and its projection 40, respectively, are guided.

Figure 7:
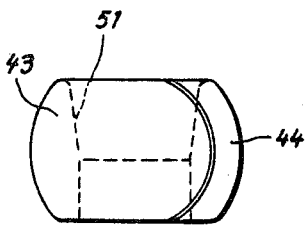
FIGS. 7 and 8 are side and end views, respectively, of a two-piece plug for use in the new valve.
Figure 8:
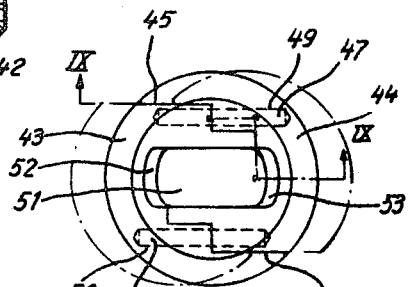
Figure 9:
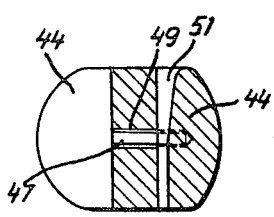
FIG. 9 is a sectional view on line IX—IX in FIG. 8.

The plug according to FIGS. 7, 8 and 9 consists of two parts 43 and 44 which can slide in relation to each other along the step-shaped parting lines 45 and 46. When its parts are pushed together, the plug 43, 44 has the same total shape as a solid plug. In order to ensure the guiding of the parts of the plug in relation to each other, the parts are provided with guide studs 47 and 48 which are firmly secured to one of the plug parts and extend into a corresponding recess 49, 50 in the other plug part. The plug parts are shown pulled away from each other by dot-dashed lines in FIG. 8. Reference numeral 51 designates a recess in the plug parts. Said recess is provided with inclined contact surfaces 52 and 53 so as to cooperate with the cams described above in connection with the three various embodiments.

The operation of the plug parts (FIGS. 7-9) requires a cam actuating the inclined surface 52 and another cam which actuates the inclined surface 53. It is necessary that said cams can operate independently of each other, and they are therefore each actuated by its own piston with cylinder and piston rod, as described above in connection with a solid plug.

We claim:
1. In a plug-type valve, the combination of a housing having an inlet and an outlet, a valve plug mounted in the housing for lateral movement in a plane common to the inlet and outlet, a sleeve-shaped resilient membrane located in the housing and surrounding the plug, said membrane being secured tightly at its ends to the housing and adapted to define therewith an annular channel through which said inlet communicates with said outlet, the plug being movable in said plane to a closing position for causing the membrane to seal one of said inlet and outlet, a cam, a supporting member mounting the cam for movement in the housing in a direction substantially perpendicular to said plane, one of said plug and cam having a surface inclined to said perpendicular direction and adapted to abut the other of said plug and cam, and means operatively connected to the cam and operable from outside the housing for actuating the cam in said perpendicular direction to move the plug in said plane to said closing position by sliding abutment of the plug and cam along said inclined surface.

2. The combination according to claim 1, in which said cam actuating means include a rod having an end portion visible outside the housing.

3. The combination according to claim 1, in which the plug has a recess adapted to receive the cam, said recess having a surface coacting with the cam and inclined to effect only slight displacement of the plug when acted upon by the cam.

4. The combination according to claim 1, in which the housing has opposed surfaces mounting the plug for said lateral movement, one of said surfaces having a recess for receiving and guiding the cam.

5. The combination according to claim 1, in which the plug includes two parts slidable relative to each other in said plane.

6. The combination according to claim 1, in which said cam actuating means include a double-acting piston-cylinder unit.

7. The combination according to claim 1, in which said supporting member is a stem extending through the valve housing.

8. The combination according to claim 1, in which said supporting member is a stem extending through the valve housing, the plug surrounding the stem with a clearance.

9. The combination according to claim 1, comprising also an extension on said cam and operable by movement of the cam in the direction opposite to said perpendicular direction to move the plug away from said closing position.

10. The combination according to claim 1, comprising also an extension on said cam and operable by movement of the cam in the direction opposite to said perpendicular direction to move the plug away from said closing position, the plug having a recess for receiving said projection.

11. The combination according to claim 1, in which said supporting member has a flat surface against which the cam is slidable.

References Cited

UNITED STATES PATENTS

| 2,097,285 | 10/1937 | Lundgren | 251—163 X |
| 2,812,154 | 11/1957 | Nordstrand | 251—331 X |
| 2,928,421 | 3/1960 | Nordstrand | 251—331 X |
| 3,141,648 | 7/1964 | White | 251—305 X |
| 3,165,119 | 1/1965 | Hewitt | 251—331 X |
| 3,207,468 | 9/1965 | Lauducci et al. | 251—163 X |

FOREIGN PATENTS 169,900  12/1959  Sweden.

SAMUEL SCOTT, *Primary Examiner.*

U.S. Cl. X.R.

251—163, 182